Nov. 10, 1925.
C. LE G. FORTESCUE
1,561,147
ELECTRICAL MEASURING DEVICE
Original Filed Oct. 24, 1917
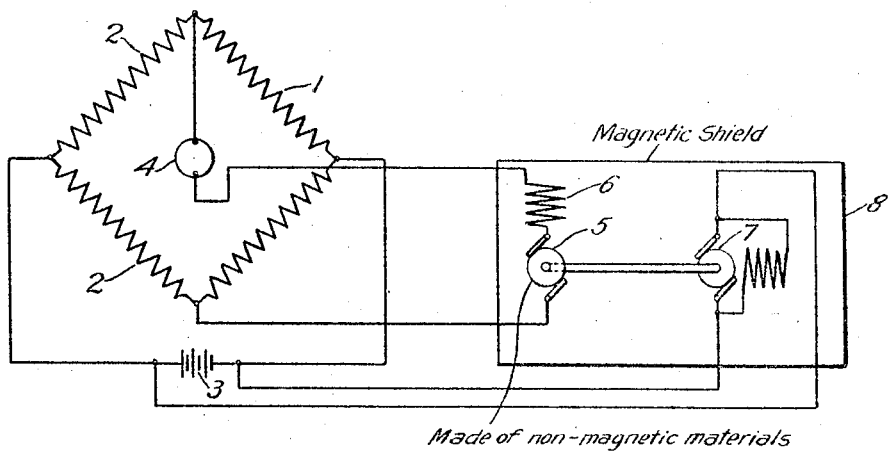
WITNESSES:
INVENTOR
*Charles Le G. Fortescue*
BY
ATTORNEY Patented Nov. 10, 1925.

1,561,147

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING DEVICE.

Original application filed October 24, 1917, Serial No. 492,158. Divided and this application filed July 24, 1925. Serial No. 45,743.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Electrical Measuring Devices, of which the following is a specification, the same being a division of my application, Serial Number 492,158, filed October 24, 1917, for electrical devices.

My invention relates to electrical devices and particularly to devices for improving the performance of electrical measuring systems.

One object of my invention is to provide means whereby energy proportional to the energy dissipated in a circuit, by reason of the electrical or physical properties of the circuit, may be supplied to thereby increase the sensitiveness of the circuit.

Another object of my invention is to provide means whereby measuring instruments that are used in null methods of measurements may be adapted to have high voltage-sensitivity under all conditions.

It is well known that the deflections of galvanometers that are used in Wheatstone bridges, and other similar null methods of measurements, are dependent upon the current traversing the same. It is also well known that high-resistance instruments are desirable because of the sensitiveness of the same.

In view of the above, I provide a series-wound generator that is connected in series with the circuit the sensitiveness of which is to be increased. The generator is driven at a constant speed from an independent source of energy. If the generator is connected in series with a galvanometer of a Wheatstone bridge and is so designed that it will supply energy to the circuit proportional to the rate of dissipation of energy in the galvanometer circuit, it will constitute what is mathematically known as a negative resistance which, under all conditions, equals the resistance of the galvanometer. Thus, the galvanometer may be designed to have a relatively large number of turns and a maximum sensitiveness under all conditions of the test.

To further increase the sensitiveness of the device, the generator may be constructed with no iron in its magnetic circuit and enclosed in an iron casing to shield the same from the earth magnetic field.

In the accompanying drawing, the single figure is a diagrammatic view of a Wheatstone bridge embodying my invention.

In the drawing, a Wheatstone bridge 1 comprises resistors 2, across two of the terminals of which a source 3 of electromotive force is connected and across the other terminals of which a galvanometer 4 is connected. A series-wound generator 5, having a field-magnet winding 6, is connected in series with the galvanometer 4 and is adapted to be actuated by a shunt-wound motor 7 that is supplied with energy from the source 3 of electromotive force. The generator 5 and the motor 7 are disposed in a casing 8 of magnetizable material for the purpose of shielding the same from the influence of the earth magnetic field. The generator 5 is preferably constructed with no magnetic materials in its magnetic circuit in order that it may be equally responsive to increasing and decreasing currents traversing the same. If the generator 5 is provided and is actuated at a constant speed to generate energy that is proportional to the energy dissipated by reason of the resistance of the galvanometer 4, the galvanometer 4 may have a relatively large number of turns and be thus sensitive under all conditions. That is, the generator 5 may be considered a negative resistance, which is equal to the resistance of the galvanometer 4 and, therefore, permits a relatively large current to traverse the same for a small difference in potential between the points of application. Thus, very accurate balancing of the bridge 1 may be obtained, and a galvanometer, which is sensitive under all conditions, may be used.

My invention is not limited to the particular system illustrated, as it may be applied to various devices without departing from the spirit and scope of the invention, as set forth in the appended claims.

I claim as my invention:

1. In a measuring system, the combination with a null-reading instrument, of independently-actuated means connected in series with the instrument for supplying energy to the instrument circuit in proportion to the energy dissipated in the instrument.

2. In a measuring system, the combination with a measuring instrument, of a series-wound generator connected in series with the instrument, means for actuating the generator at a constant speed, and means for shielding the generator from the earth's magnetic field.

3. The combination with a null-reading electrical measuring instrument, of independently-actuated means connected to the instrument for supplying energy to the instrument circuit in proportion to the energy dissipated in the instrument, whereby a large deflection will be obtained for a very small impressed electromotive force.

In testimony whereof, I have hereunto subscribed my name this 22nd day of July 1925.

CHARLES LE G. FORTESCUE.